(12) United States Patent
Eba

(10) Patent No.: US 7,026,779 B2
(45) Date of Patent: Apr. 11, 2006

(54) MOTOR CONTROL APPARATUS FOR CONTROLLING OPERATION OF MOVER OF MOTOR

(75) Inventor: Koji Eba, Aichi (JP)

(73) Assignee: Okuma Corporation, Aichi (JP)

(*) Notice: Subject to any disclaimer, the term of this patent is extended or adjusted under 35 U.S.C. 154(b) by 111 days.

(21) Appl. No.: 10/950,888

(22) Filed: Sep. 27, 2004

(65) Prior Publication Data

US 2005/0067996 A1 Mar. 31, 2005

(30) Foreign Application Priority Data

Sep. 29, 2003 (JP) .................... 2003-336837

(51) Int. Cl.
*G05B 11/36* (2006.01)

(52) U.S. Cl. .............. 318/609; 318/560; 318/610; 318/629; 318/632

(58) Field of Classification Search ........ 318/560–563, 318/567–569, 607–618, 628–632
See application file for complete search history.

(56) References Cited

U.S. PATENT DOCUMENTS 6,274,994 B1 * 8/2001 Tsutsui .............. 318/560
6,515,442 B1 * 2/2003 Okubo et al. ......... 318/560
6,590,358 B1 * 7/2003 Tsutsui ............... 318/560

FOREIGN PATENT DOCUMENTS

JP   1209982    8/1989
JP   2000228893 8/2000

* cited by examiner

*Primary Examiner*—Paul Ip
(74) *Attorney, Agent, or Firm*—Gauthier & Connors LLP

(57) ABSTRACT

A motor control apparatus of the present invention comprises a velocity detector for detecting a rotation velocity of a mover of a motor, a position detector for detecting a position of the mover, a differentiator for performing time differentiation with respect to the position detected by the position detector to obtain a velocity calculation value, a feedback signal generating circuit for generating a feedback signal including the velocity detection value obtained by the velocity detector as a high frequency component and the velocity calculation value obtained by the differentiator as a low frequency component, and a linear amplifier and an integrating amplifier for performing PI control, the linear amplifier and the integrating amplifier performing linear amplification and integrating amplification of a difference between the velocity instruction and the feedback signal, respectively.

7 Claims, 15 Drawing Sheets

MOTOR CONTROL APPARATUS FOR CONTROLLING OPERATION OF MOVER OF MOTOR

The entire disclosure of Japanese Patent Application No. 2003-336837 filed on Sep. 29, 2003, including the specification, claims, drawings, and abstract, is incorporated herein by reference.

BACKGROUND OF THE INVENTION

1. Field of the Invention

The present invention relates to a motor control apparatus for controlling rotation of a motor in accordance with a position instruction or a velocity instruction from an upper control apparatus, to a motor control apparatus used for driving a transfer table of a machine tool, for example.

2. Description of Related Art

Motor control apparatuses for driving a table of a machine tool using a DC servo motor as shown by the control block in FIG. 11 were generally used through the early 1980s. From about the middle of the 1980s, the system structure as shown in FIG. 12 using a brushless servomotor and a position detector became common because this structure eliminates the need for maintenance of the brushes of the DC servo motor and the velocity detector (tachogenerator), and allows for digital processing of a velocity instruction and a velocity feedback signal to thereby increase precision of the velocity detector by reducing temperature drift of its gain and offset. During the transition period, a brushless tachogenerator having a schematic configuration as shown in FIG. 13 was commonly used as a means to realize brushless structure. The operations of the related art examples as described above will be described.

FIG. 11 is a block diagram showing an example typical structure of a motor control apparatus using a DC motor. A velocity detector 17 is mechanically coupled to the DC motor 15 for detecting the rotation velocity of the DC motor 15. A position detector 18 is also mechanically coupled to the DC motor 15 for detecting the position of a driving target of the motor. A subtractor 1 obtains a difference between a position instruction value θ* supplied from an upper control apparatus and a position detection value θ supplied from the position detector 18. The difference value is multiplied with a position loop gain by a linear amplifier 2 to obtain a velocity instruction value V*. Subsequently, a subtractor 4 obtains a difference between the velocity instruction value V* and a velocity detection value V supplied from the velocity detector 17. The value thus obtained is amplified by a linear amplifier 6 and an integrating amplifier 7, for performing PI control, and outputs from the linear amplifier 6 and the integrating amplifier 7 are added by an adder 8 to provide a current instruction value I*, which is proportional to the motor torque necessary to follow the instruction. A current control section 11 obtains a difference between a current detection value I supplied from a current detector 14 connected to a motor winding and the current instruction value I*, which is further subjected to linear amplification and integrating amplification to obtain an applied voltage instruction value E* to be applied to the motor. A single-phase PWM inverter 12 applies a voltage to the DC motor 15 in accordance with the applied voltage instruction value E*. Thus, the rotation position (rotation angle) of the rotor is controlled so as to comply with the position instruction value θ* supplied from the upper control apparatus. Here, a tachogenerator which is configured such that a magnet is provided on a stator and a plurality of windings are provided on a rotor, and a commutator and a brush are used to extract a winding induced voltage as a DC analog voltage, has been used as the velocity detector 17. Accordingly, the above structure suffers from problems such as a gain error in the winding induced voltage and an offset error in a circuit which processes an analog signal, whereas the applications require high precision.

FIG. 12 is a block diagram showing a typical structure example of a motor control apparatus using an AC motor, as has become commonly employed in current years. In FIG. 12, elements having the same functions as those in FIG. 11 are designated by the same numerals and only the difference between the structures in FIGS. 11 and 12 will be described. The motor 16, which is a three-phase AC motor, is provided with current detectors corresponding to two phases, namely a U phase current detector 14u and a V phase current detector 14v. The current detection values Iu and Iv detected by these current detectors, respectively, are fed back to a current control section 11. Further, a torque instruction value T* output from the adder 8 is converted into a U phase current instruction value Iu* and a V phase current instruction value Iv* in a current distribution section 9 based on the position detection value θ. A three-phase PWM inverter 13 receives inputs of voltage instructions Eu*, Ev*, and Ew* corresponding to three phases, from the current control section 11.

The position detector 18 is a rotary encoder. Because an angular resolution corresponding to 100,000 to 1,000,000 divisions or more per motor rotation is required for the position detector 18, the position detector 18 is configured such that an interpolation signal having a sine wave whose amplitude changes several tens to several thousands of times per rotation of the encoder in accordance with the motor angle is output by a magnetic or optical means. Then, in order to obtain a position detection value $\theta_k$, a change in the signal amplitude is counted or a signal having a sine wave is sampled by the A/D converter to perform an inverse trigonometric function operation. In this structure, a velocity detector is not used for velocity detection. Rather, the potion detection value $\theta_k$ output from the position detector 18 is subjected to time differentiation in a differentiator 19 to obtain a velocity calculation value dθ/dt. The position detector 18 may be formed using a resolver.

The present invention was made in consideration of precision and responsiveness of velocity detection. The process performed in the differentiator 19 when the position detection period is $\Delta t_\theta$ will be described with reference to FIG. 14. In FIG. 14, the timing at which an interpolation signal having a sine wave output from the position detector 18 is indicated by a numeral 300 as position detection data sampling timing. The rotor angle in the instance of sampling is detected. Then, the position detection value $\theta_k$ is obtained after elapse of the position detection delay time $t_{d\theta}$ to allow for A/D conversion and calculation. The position detection delay time $t_{d\theta}$ includes transfer time when data is transferred serially between the position detector 18 and the differentiator 19. Further, the velocity calculation value $v_k$ is obtained from the following expression (1) and represents the velocity at the intermediate time point between the sampling timing $t_{k-1}$ and $t_k$. More specifically, in the following expression (1), the inclination between the two points, $(t_{k-1}, \theta_{k-1})$ and $(t_k, \theta_k)$, which substantially corresponds to the inclination at the intermediate point between these points, is obtained. Accordingly, the calculation result obtained from the expression (1) is data at the time point which is previous to the sample timing $t_k$ by $\Delta t_\theta/2$, and can be approximated as $v_k \approx v(t_k - \Delta t_\theta/2)$. In other words, the velocity detection delay time $t_{dv}$ is increased compared to the position detection delay.

$$v_k = (\theta_{k-1} - \theta_k)/(t_k - t_{k-1}) \quad (1)$$

Although a delay time as above causes no problem under a constant velocity, in a transient state, such a delay time results in a relatively great amount of error components in the high frequency response and deteriorates control characteristics of the motor. In this system, however, because the velocity is calculated by mechanically detecting the position data by the position detector and also by obtaining a difference of the position detection data by a time difference with the precision of a crystal oscillator, a DC gain error and an offset error are not included in the velocity.

In addition to the problem that a gain error and an offset error are included in the velocity detection value as described above, the brushless tachogenerator velocity detector suffers from another problem that torque ripples are generated. This problem will be described with reference to the example structure of a brushless tachogenerator shown in FIG. 13. The brushless tachogenerator includes, as a detection mechanism, a permanent magnet 80 mounted on the rotor section, four sets of windings 82a, 82b, 83a, 83b with which the magnetic flux of the permanent magnet 80 is linked to generate induced voltage, and a pair of Hall sensors 81a, 81b having the magnetic flux detection directions different from each other by 90 degrees in the rotation angle. By selecting the induced voltage $v_a$, $v_b$, $v_{a-n}$, or $v_{b-n}$ of each winding 82a, 82b, 83a, 83b by a signal selection switch 84, and inputting the selected induced voltage to a voltage follower circuit 86, an output voltage $v_o$ of the velocity detection value is output. Further, a winding selection signal generating section 85 determines, from the outputs from the Hall sensors 81a and 81b, which angle area the north (N) pole of the permanent magnetic 80 is in, and outputs a selector signal $s_{a1}$, $s_{b1}$, $s_{a2}$, or $s_{b2}$ indicative of which of the four analog switches is to be selected. FIG. 16 shows a signal waveform in each section when the velocity detector rotates at a constant velocity, with the horizontal axis representing the rotation angle θ of the rotor section. The distribution of flux linkage between windings 82a, 82b, 83a, and 83b and the magnet 80 is set such that the induced voltage $v_a$, $v_b$, $v_{a-n}$, and $v_{b-n}$ of the windings 82a, 82b, 83a, 83b, respectively, form a substantially trapezoidal wave with respect to the rotation angle θ. By sequentially switching the four analog switches every 90 degree, the induced voltage $v_a$, $v_b$, $v_{a-n}$, and $v_{b-n}$ of the windings 82a, 82b, 83a, 83b are output in sequence. Consequently, the output voltage $v_o$ corresponds to a voltage which is in proportion to the rotation velocity. In this system, however, because the number of flux linkages in the selected angle area is not entirely constant, and, because the amplitude ratio varies in the induced voltage $v_a$, $v_b$, $v_{a-n}$, and $v_{b-n}$ of the windings 82a, 82b, 83a, 83b, and so on, periodical detection ripples are generated mainly in the switching points of the windings 82a, 82b, 83a, and 83b.

It is clear that in order to meet the needs for increasing precision and speed of the servo control, an effective means would be to reduce the position control period and the velocity control period to thereby increase the disturbance responsiveness. For this reason, an increase in the processing speed of a CPU available for control operations and a reduction in the control period has been attempted. As a result, the velocity control period in the general machining tool application, which was approximately 1 ms in the middle of 1980's, has been reduced to approximately 100 μs (1/10) to 50 μs (20/1) at the present time.

Reduction in the velocity control period, however, results in disadvantages. Specifically, when a velocity calculation value dθ/dt is obtained by time differentiation of the rotation position θ detected by the position detector, the velocity control period is used as a denominator dt for obtaining the velocity calculation value dθ/dt. Accordingly, the more the velocity control period dt is reduced, the more a positional error contained in the rotation position θ detected by the position detector is reflected in the velocity calculation value dθ/dt. When the velocity control period is reduced to 1/N, for example, a detection error in the position detector and a quantization error due to minimum resolution are amplified by N times compared to the conventional case, and are output in the velocity detection value, and therefore in the output torque. Consequently, the velocity calculation value dθ/dt includes significant high frequency ripples, which leads to torque ripples in the motor rotation. Here, the torque ripples are significantly influenced by the output of the linear amplifier which performs PI control and are less influenced by the output of the integrating amplifier.

At present, due to the greater desire to reduce the velocity control period to increase the velocity feedback sensitivity, the precision and the required resolution of a position detector for the purpose of velocity control are higher than the precision and the required resolution of the position detector for the purpose of position detection. For example, a feed mechanism of a machining tool for performing mirror surface processing in which the motor torque ripples are suppressed to a rated torque ratio below 1% requires a position detector having a precision exceeding 10,000,000 divisions per motor rotation. Thus far, increasing the resolution and the precision of a position detector has been achieved by increasing the periodicity of the interpolation signal per rotation. However, an increase of the number of periods per rotation results in an increase in the signal frequency at the time of motor rotation, which causes a technical problem that, due to the phase delay of an interpolation signal, correction of an electrical and mechanical error cannot be performed with high precision even at the low speed operation.

SUMMARY OF THE INVENTION

The present invention advantageously reduces torque ripples in a motor control apparatus in which the velocity detection period is reduced to achieve high frequency response.

In accordance with one aspect of the present invention, a motor control apparatus for controlling the operation of a mover of a motor in accordance with a velocity instruction comprises a velocity detector for detecting a rotation velocity of the mover, a position detector for detecting a position of the mover, a velocity calculation unit for obtaining a velocity calculation value by means of time differentiation of the position detected by the position detector, a feedback signal generating circuit for generating a feedback signal including the velocity detection value obtained by the velocity detector as a high frequency component and the velocity calculation value obtained by the velocity calculation unit as a low frequency component, and a linear amplifier and an integrating amplifier for performing PI control, the linear amplifier and the integrating amplifier performing linear amplification and integrating amplification of a difference between the velocity instruction and the feedback signal, respectively. Here, the boundary between the high frequencies and the low frequencies is set using, as a target frequency of, for example, approximately 1/10 of the cutoff frequency of 100 to 500 Hz of velocity control for devices including general mechanical systems. In this case, frequencies over 10 to 50 Hz are set as the high frequency and frequencies 10 to 50 or less are set as the low frequency.

Further, the above-described low frequency component includes a direct current component of 0 frequency. As used herein, a mover of the motor refers to a rotor of a rotation motor or a movable portion of a linear motor.

With the above structure, the velocity detector detects the velocity of the motor as a physical amount without performing a differential operation for obtaining the velocity as required by the position detector. Consequently, the detection resolution and the detection precision of the velocity detector is not lowered even in the high frequency region. By using the velocity detection value obtained by the velocity detector as described above as a high frequency component of a feedback signal, notable ripple components caused by linear amplification of high frequency components by a linear amplifier will not be increased. It is therefore possible to obtain preferable motor control characteristics in which torque ripples generated from the velocity detection ripples are reduced to a significant degree. Further, because the velocity calculation value obtained by the velocity calculation unit is used as a low frequency component of a feedback signal as in the conventional control apparatuses, the apparatus is free from direct influence of a gain error and an offset error similar to the conventional control apparatuses. In addition, of the velocity detection delay time described with reference to FIG. 15, no delay time corresponding to Δte/2 is generated. Accordingly, when the present invention is applied to the conventional control apparatus as shown in FIG. 12, the time delay in the velocity detection can be reduced even with the same velocity detection period. Also, because the detection output from the position detector is not used for calculation of the velocity, the detection resolution of the position detector need not be increased any more than necessary.

In accordance with another aspect of the present invention, a motor control apparatus for controlling the operation of a mover of a motor in accordance with a velocity instruction may comprise a velocity detector for detecting the rotation velocity of the mover, a position detector for detecting a position of the mover, a velocity calculation unit for obtaining a velocity calculation value by means of time differentiation of the position detected by the position detector, and a linear amplifier and an integrating amplifier for performing PI control, the linear amplifier performing linear amplification of a difference between the velocity instruction and the velocity detection value obtained by the velocity detector and the integrating amplifier performing integrating amplification of a difference between the velocity instruction and the velocity calculation value obtained by the velocity calculation unit. With the above structure, because the velocity calculation value obtained by time differentiation of the position is not subjected to amplification by the linear amplifier, ripple components are not increased, and therefore preferable motor control characteristics can be obtained.

Preferably, the apparatus further includes a velocity detection value correction section which has information concerning an offset error and corrects an offset error contained in the velocity detection value detected by the velocity detector based on the information. Further, it is preferable that the apparatus further includes a velocity detection value correction section which has a correction table which stores gain error information corresponding to the position information, captures the position detection value from the position detector, reads out the corresponding gain error information with reference to the correction table, and corrects the gain error contained in the velocity detection value obtained by the velocity detector based on the gain error information. With the above structures, in which the gain error or the offset error is corrected, it is possible to reduce the gain error or the offset error, which are disadvantages when the velocity detection value from the velocity detector is used, thereby achieving more precise motor control.

Preferably, the motor control apparatus further includes a correction table (or correction data) generating section for generating data for the offset error or the correction table, based on a difference between the velocity detection value from the velocity detector and the velocity calculation value obtained by time differentiation of the position detected by the position detector. With this structure, it is possible to automatically calibrate a correction table to increase the correction precision. It is also possible to continuously obtain an optimum correction value, even when the velocity detector or the like is replaced by a service person or when the apparatus is mounted to a machine for the first time. Further, influences of a change in the gain error or the offset error over time can be prevented.

Preferably, the velocity detector includes a magnet fixed on one of a mover and a stator and a plurality of windings fixed to the other one of the mover and the stator for generating a plurality of induced voltages having different phases depending on the change of flux linkage of the magnet, and the control apparatus includes correction means which has a flux linkage table which stores information on the number of flux linkages corresponding to the position information, captures the position detection value from the position detector, obtains information of the number of flux linkages corresponding to the position detection value with reference to the flux linkage table, and corrects the induced voltage generated by the plurality of windings based on the information of the number of flux linkages. With the above structure, it is possible to reduce the torque ripples. Further, it is preferable that the motor control apparatus includes a flux linkage table calibration section for calibrating data of the flux linkage table based on the velocity calculation value obtained by time differentiation of the position detection value detected by the position detector and the induced voltage value of each of the windings. With this structure, it is possible to maintain low torque ripples, even with maintenance and changes over time.

BRIEF DESCRIPTION OF THE DRAWINGS

Preferred embodiments of the present invention will be described in detail based on the following drawings, wherein.

DETAILED DESCRIPTION OF PREFERRED EMBODIMENTS

Embodiments of the present invention will be described in detail based on the drawings. While the example configurations of each embodiment described below employ a rotating motor and a rotating velocity detector, the control method described is the same when a linear motor and a linear velocity detector are used. Accordingly, the present invention is not limited to a rotating motor, and is also applicable to a linear motor.

(1) First Embodiment

Figure 1:
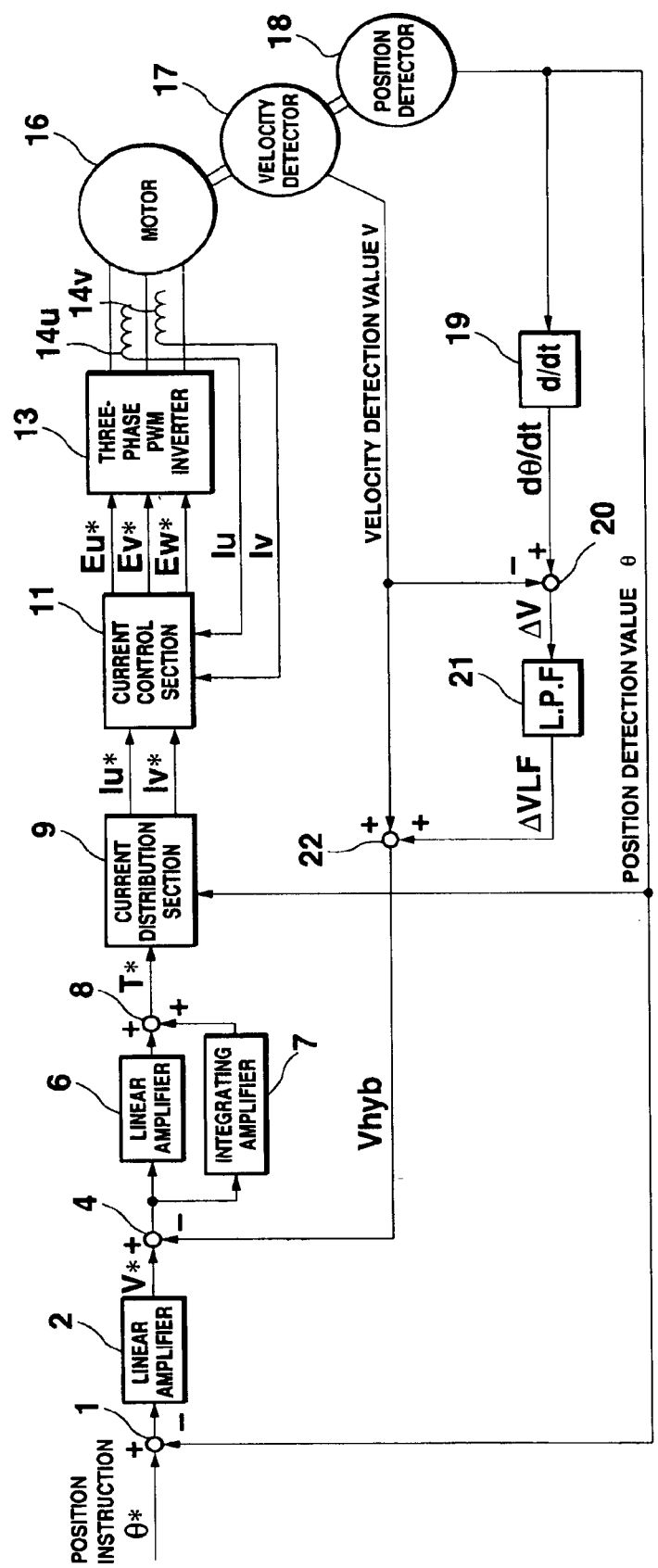
FIG. 1 is a block diagram showing a motor control apparatus according to a first embodiment of the present invention.

FIG. 1 schematically shows a structure of a motor control apparatus according to a first embodiment to the present invention. The motor control apparatus of the present embodiment includes subtractors 1 and 4, an adder 8, linear amplifiers 2 and 6, an integrating amplifier 7, a current distribution section 9, current control section 11, a three-phase PWM inverter 13, a position detector 18, a differentiator 19, and so on, each having the same function and the same reference numeral as the corresponding element in the related art structure shown in FIG. 12.

The motor control apparatus of the present embodiment differs from those of the related art in that a velocity detector 17, a subtractor 20, a low pass filter 21, and an adder 22 are provided, and that a velocity feedback signal $V_{hyb}$ to be input to the subtractor 4 is computed according to a method different from that of the related art. The velocity feedback signal $V_{hyb}$ is generated based on a velocity detection value V output from the velocity detector 17 which is newly added and a velocity calculation value dθ/dt obtained by differentiation of a position detection value output from the position detector 18 by the differentiator 9. More specifically, first, a difference ΔV between the velocity calculation value dθ/dt and the velocity detection value V is calculated by the subtractor 20. The difference ΔV is then caused to pass through the low pass filter 21 to extract a low frequency component $ΔV_{LF}$ in the difference ΔV. Subsequently, the low frequency component $ΔV_{LF}$ and the velocity detection value V are added in the adder 22 to generate a velocity feedback signal $V_{hyb}$.

The gain of the low pass filter is closer to 0 as the frequency of an input signal becomes higher, and the gain of the low pass filter is closer to 1 as the frequency of an input signal becomes lower. Accordingly, the low frequency component of the velocity feedback signal $V_{hyb}$ corresponds to the velocity calculation value dθ/dt and the high frequency component correspond to the velocity detection value V. Here, the frequency of the low pass filter 21 is determined to be approximately 10 to 50 Hz, using, as a target, a frequency of approximately 1/10 of the cutoff frequency of 100 to 500 Hz for velocity control of devices including general mechanical systems.

As described above, because the velocity calculation value dθ/dt is calculated using the velocity control period dt as the denominator, the greater the reflection of the position error contained in the detection output of the position detector 18 in the velocity calculation value dθ/dt, the greater will be the reduction in the velocity control period dt. However, because the high frequency components of the velocity calculation value dθ/dt are removed by the low pass filter 21 as described above, the velocity feedback signal $V_{hyb}$ is not affected by the position detection error of the position detector 18. As a result, it is possible to reduce the torque ripples generated in the motor. Further, as an approximation of the velocity calculation value dθ/dt, the velocity detection value V, which is a high frequency component of the velocity feedback signal, is obtained without performing time differentiation, and, therefore, the reduction of the control period does not affect the velocity detection error. As a result, the torque ripples are not increased.

(2) Second Embodiment

Figure 2:
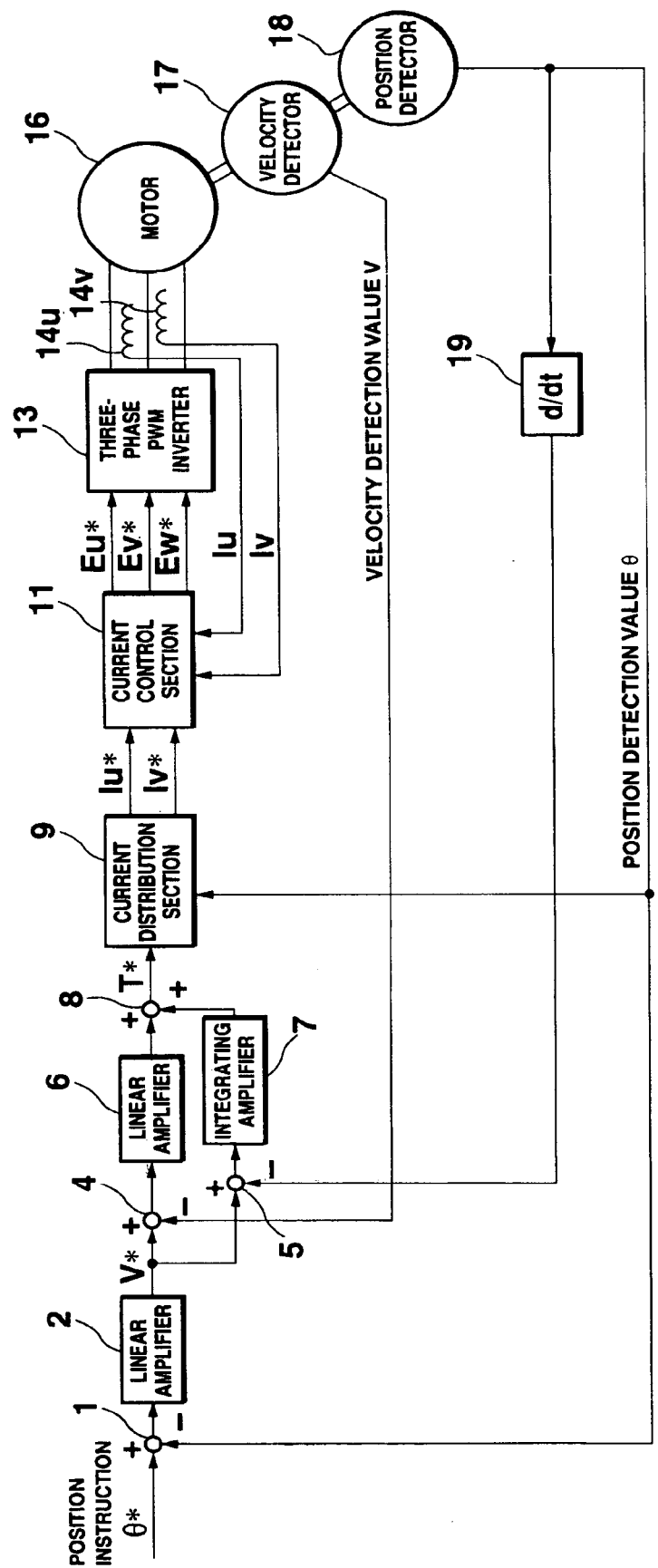
FIG. 2 is a block diagram showing a motor control apparatus according to a second embodiment of the present invention.

FIG. 2 schematically shows a structure of a motor control apparatus according to a second embodiment of the present invention. The motor control apparatus of the present embodiment includes subtractors 1 and 4, an adder 8, linear amplifiers 2 and 6, an integrating amplifier 7, a current distribution section 9, current control section 11, a three-phase PWM inverter 13, a position detector 18, a differentiator 19, and so on, each having the same function and the same reference numeral as the corresponding element in the related art structure shown in FIG. 12.

The motor control apparatus of the present embodiment differs from the related art in that two velocity information items, namely a velocity detection value V from the velocity detector 17 and a velocity calculation value dθ/dt obtained by time differentiation of a position calculation (detection) value θ output from the position detector 18, are first obtained as a velocity feedback signal. Then, the subtractor 4 which is coupled to the linear amplifier 6 computes a difference between a velocity instruction value V* and the velocity detection value V, and the calculated difference is then input to the linear amplifier 6. Further, the substractor 7 which is coupled to the integrating amplifier 7 computes a difference between the velocity instruction value V* and the velocity calculation value dθ/dt, and the calculated difference is then input to the integrating amplifier 7.

Figure 12:
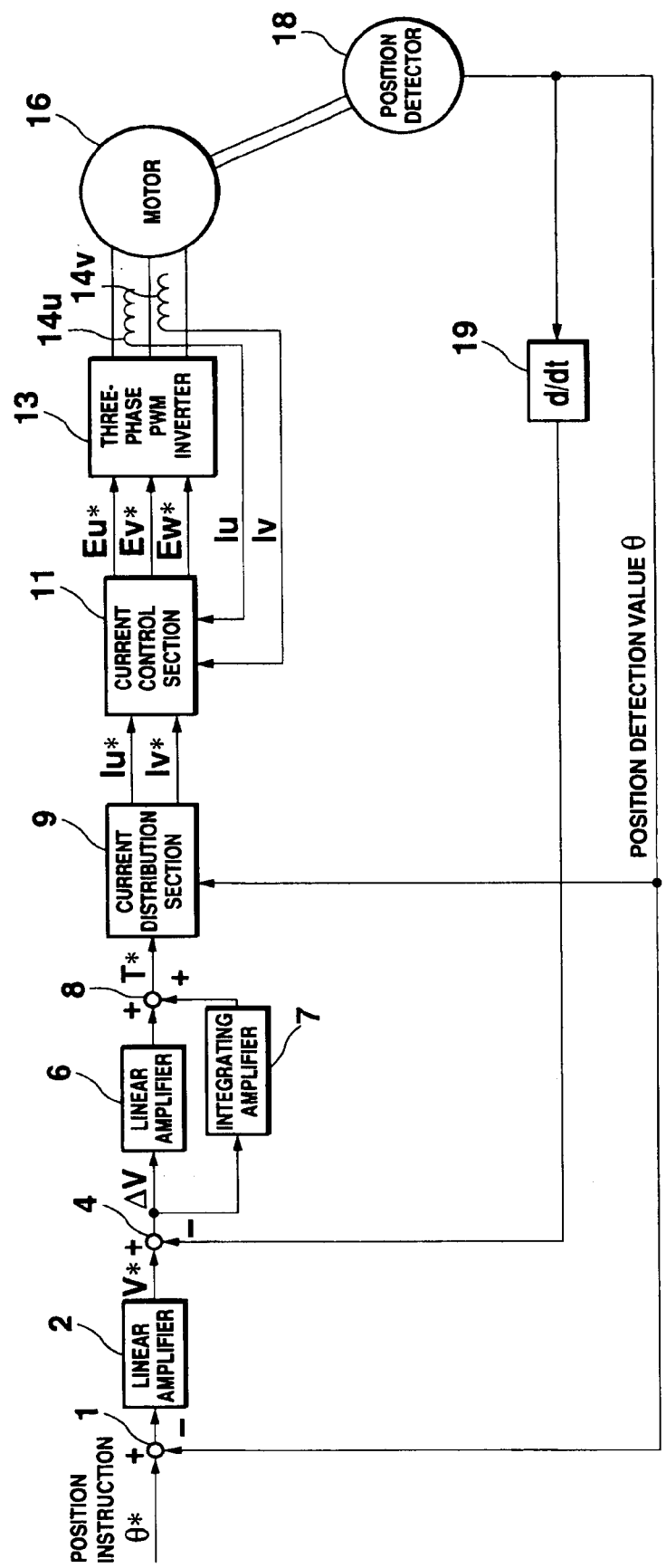
FIG. 12 is a block diagram showing another motor control apparatus of related art.

As described above, and contrary to the related art shown in FIG. 12, only the velocity detection value V from the velocity detector 17 is fed back to the subtractor 4 coupled to the linear amplifier 6; the velocity calculation value dθ/dt from the position detector 18 is not fed back. Feedback of velocity detection value V is advantageous in that this value is free from effects of detection delay due to a differentiation operation and by the increase of high frequency components, as found in the velocity calculation value dθ/dt. Accordingly, by feeding the velocity detection value V back to the linear amplifier 6, it is possible to prevent the high frequency position error component from being reflected significantly in the torque instruction T*, whereby preferable motor control in which generation of torque ripples is reduced can be achieved.

On the other hand, the velocity calculation value dθ/dt from the differentiator 19 is fed back to the subtractor 5 coupled to the integrating amplifier 7, as in the related art shown in FIG. 12, because detection delay of the velocity calculation value dθ/dt and increase of high frequency components will not create any significant problems in the integrating amplification in the integrating amplifier 7, and rather because accurate control is disturbed by the gain error or the offset error contained in the velocity detection value V.

(3) Third Embodiment

Figure 3:
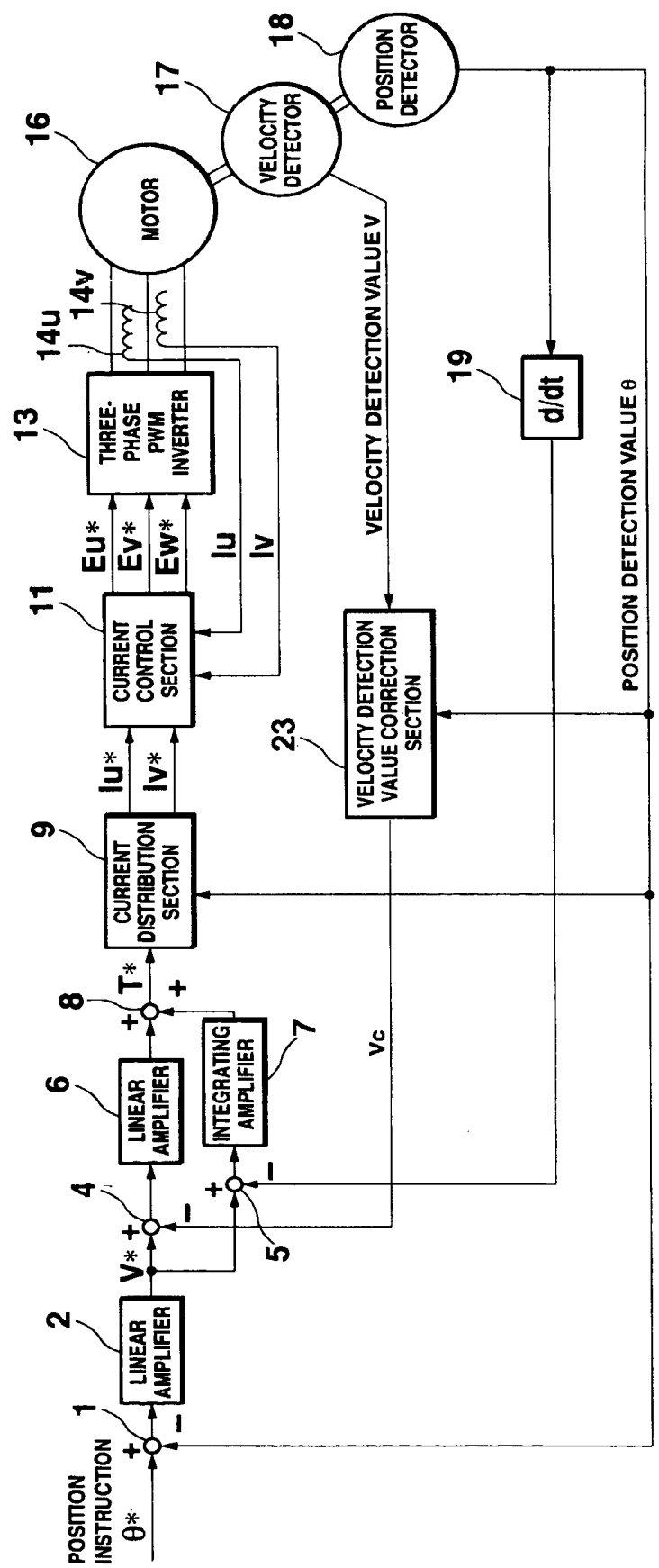
FIG. 3 is a block diagram showing a motor control apparatus according to a third embodiment of the present invention.

FIG. 3 schematically shows a structure of a motor control apparatus according to a third embodiment of the present invention. The motor control apparatus of this embodiment has a structure similar to that of the second embodiment, and elements having the same functions as those in the second embodiment are denoted by the same numerals.

The motor control apparatus of the third embodiment differs from the motor control apparatus of the second embodiment in that a velocity detection value correction section 23 is additionally provided. The velocity detection value V is corrected by the velocity detection value correction section 23 and the corrected velocity detection value Vc is input to the subtractor 4 as a feedback signal.

Figure 4:
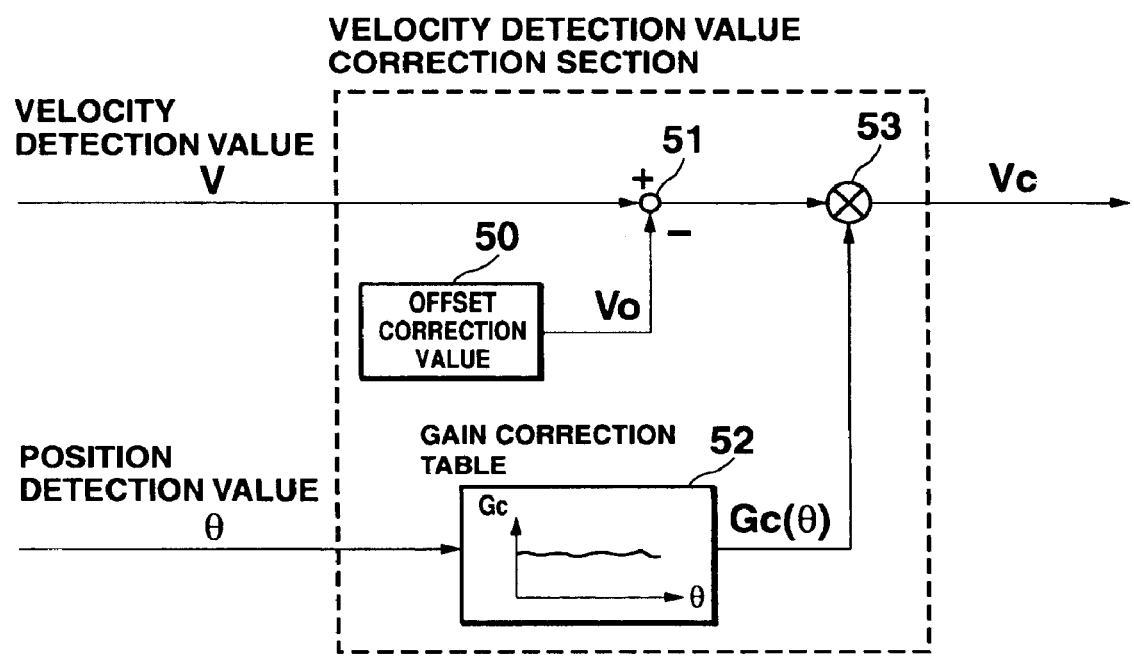
FIG. 4 is a block diagram showing a velocity detection value correction section.

The velocity detection value correction section 23 has a structure shown in the block diagram of FIG. 4. The velocity detection value V and the position detection value θ are input to the velocity detection value correction section 23. A DC offset value $V_o$ corresponding to an offset error of the velocity detector 17 is previously set in an offset correction value storage section 50. A subtractor 51 subtracts the DC offset value $V_o$ from the velocity detection value V input from the velocity detector 17, to thereby correct an offset error contained in the velocity detection value V.

A gain error coefficient Gc(θ) of the velocity detector 17 is measured in advance at predetermined intervals of the motor rotation angle θ and stored in a gain correction table 52. Here, the gain error coefficient Gc(θ) can be obtained by dividing the actual rotation velocity of the motor by the velocity detection value V including a gain error. When a position detection value θ which is sampled at the same timing as the velocity detection value V is input, the velocity detection value correction section 23 refers to the gain correction table 52 for reading out the gain error coefficient Gc(θ) corresponding to the position detection value θ. This gain error coefficient Gc(θ) is multiplied with the velocity detection value V in the adder 53, which then outputs a corrected velocity detection value Vc. Thus, the gain error contained in the velocity detection value V is corrected.

According to the present embodiment, the velocity detection value Vc obtained by correcting the offset error and the gain error as described above is fed back to the linear amplifier 6. Consequently, it is possible to reduce ripples caused by high frequency components of velocity feedback, so that more accurate motor control can be achieved. While in the present embodiment both the offset error and the gain error are corrected, just one of these values may be corrected. Further, while the velocity detection value correction section 23 is provided in the motor control apparatus of FIG. 2 in the above example, the velocity detection value correction section 23 may be provided in the motor control apparatus of FIG. 1.

(4) Fourth Embodiment

Figure 5:
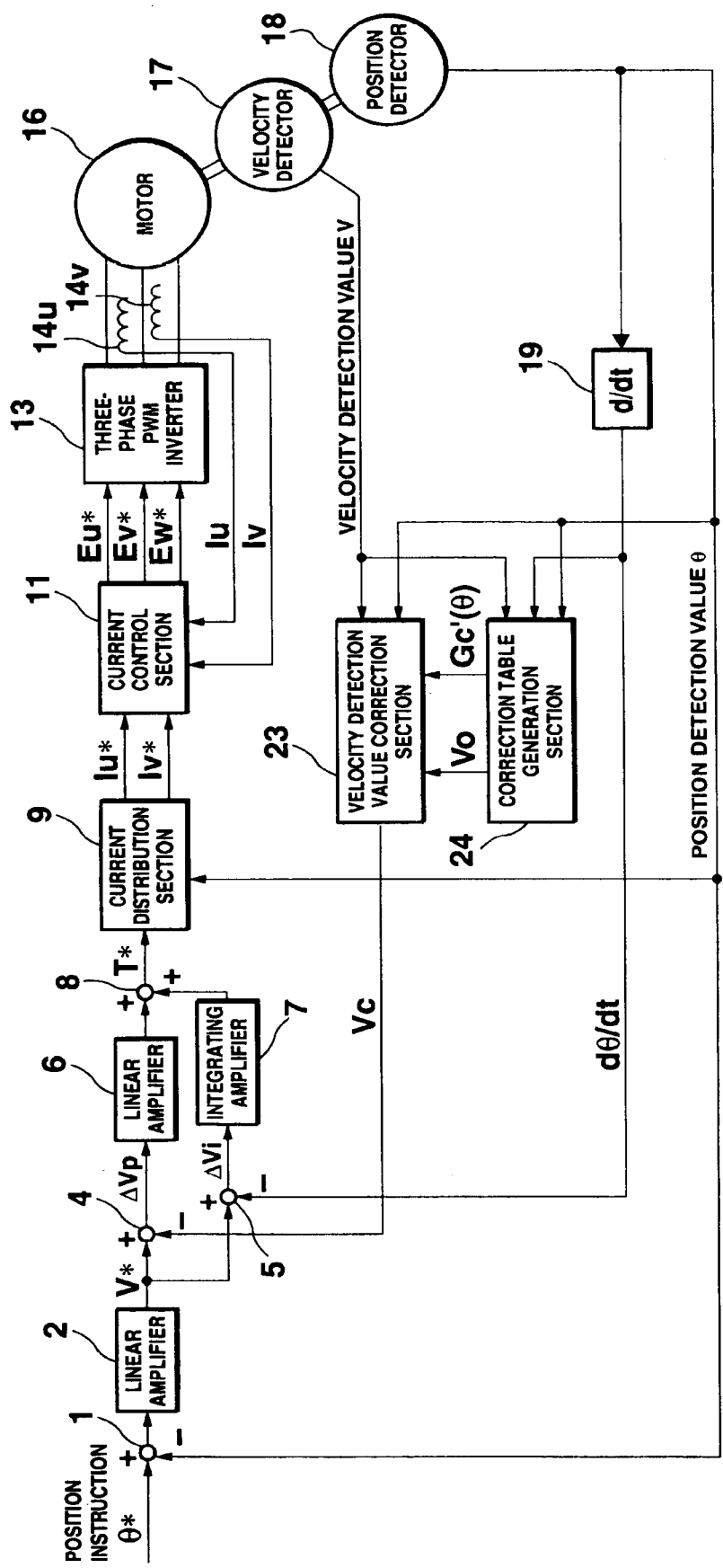
FIG. 5 is a block diagram showing a motor control apparatus according to a fourth embodiment of the present invention.

FIG. 5 schematically shows a structure of a motor control apparatus according to a fourth embodiment of the present invention. The motor control apparatus of this embodiment has a structure similar to that of the third embodiment, and elements having the same functions as those in the third embodiment are denoted by the same numerals.

The motor control apparatus of the fourth embodiment differs from that of the third embodiment in that a correction table generation section 24 is further provided. The correction table generation section 24 generates and updates the data of the offset correction value storage section 50 and the gain correction table 52 in the velocity detection value correction section 23.

Figure 6:
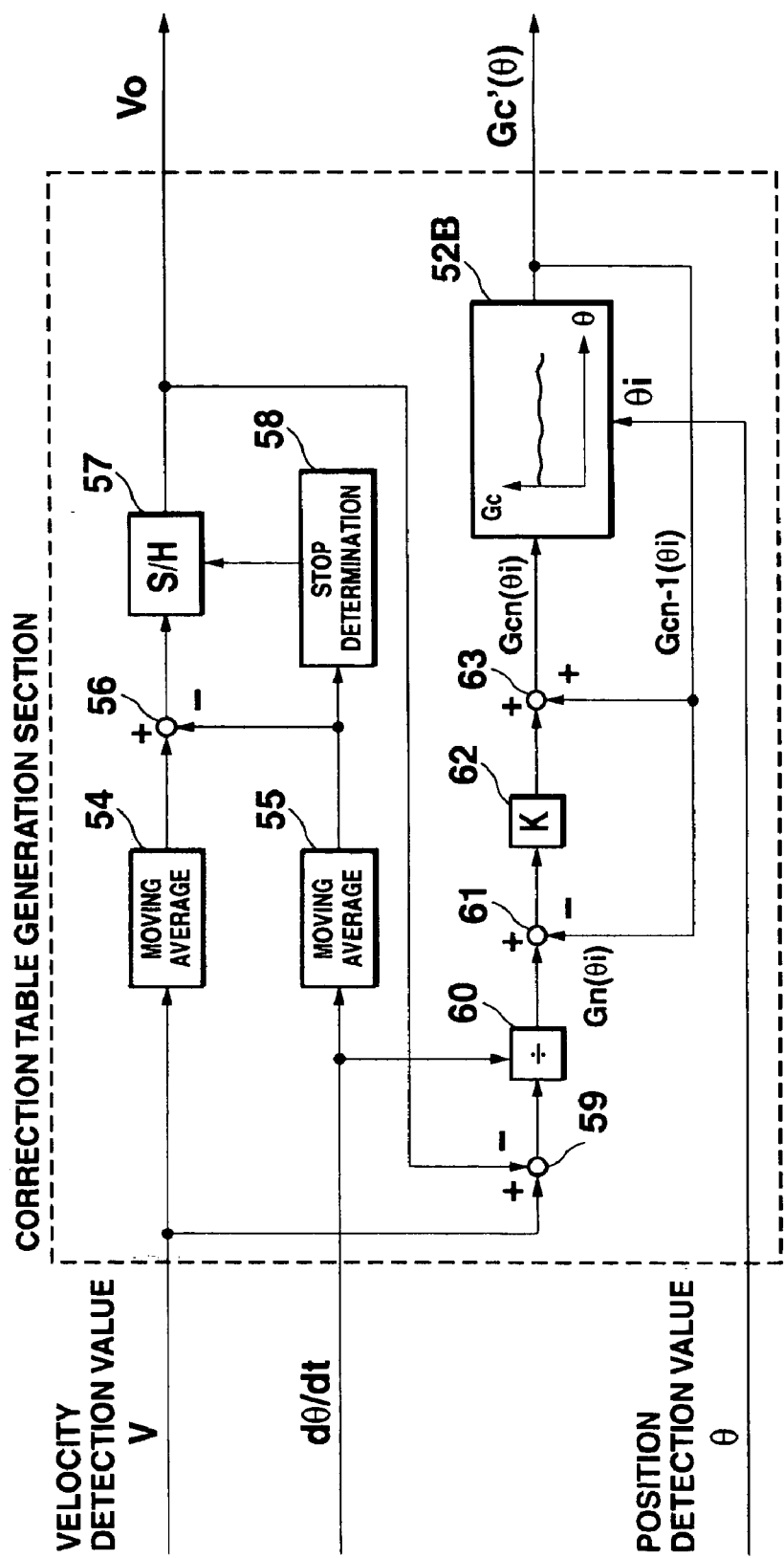
FIG. 6 is a block diagram showing a correction table generation section.

The correction table generation section 24 has a structure as shown in a block diagram of FIG. 6, and the operation of the correction table generation section 24 will be described with reference to this FIG. 6. The velocity detection value V, the velocity calculation value dθ/dt, and the position detection value θ are input to the correction table generation section 24. The velocity detection value V and the velocity calculation value dθ/dt are input to moving average calculation sections 54 and 55, respectively, to obtain moving averages, and both outputs are then input to a subtractor 56 to obtain a difference therebetween. The moving average result of the velocity calculation value dθ/dt is supplied to a stop determination section 58. When the stop determination section 58 determines that the motor has been stopped for a specific predetermined period of time or longer, the output from the subtractor 56 is sampled by a sample hold section 57 as an offset correction value $V_o$ contained in the velocity detection value V.

Further, after the subtractor 59 subtracts the offset correction value $V_o$ from the velocity detection value V, a divider 60 divides the result by the velocity calculation value dθ/dt to obtain a ratio $G_n(θ_i)$. Meanwhile, a gain error table 52B, similar to the gain correction table 52, stores gain error data corresponding to the motor angle $θ_i$. When the position detection value θ is input to the gain error table 52B, the gain error coefficient data $Gc_{n-1}(θ_i)$ corresponding to the input position detection value θ is extracted from the gain error table 52B and is output to the subtractor 61 and the adder 63. The subtractor 61 then obtains a difference between the ratio $G_n(θ_i)$ supplied from the divider 60 and the gain error coefficient $Gc_{n-1}(θ_i)$. The difference is further multiplied with a time constant K (K=1 or less) in a coefficient multiplier 62 and the result is further added with the gain error coefficient $Gc_{n-1}(θ_i)$ in the adder 63. The resultant gain error coefficient $Gc_n(θ_i)$ is stored, as new data, in the gain error table 52B. Here, the subtractor 61, the coefficient multiplier 62, and the adder 63 constitute a filter indicating an index response and therefore prevents the gain error table from mislearning due to noise components mixed in the velocity detection value and the position detection value.

The data Gc(θ) obtained from the gain error table 52B and the offset correction value $V_o$ obtained from the sample hold section 57 are regularly forwarded to the velocity detection value correction section 23. Also, the data of the gain correction table 52 and the offset correction value storage section 50 are updated. It is therefore possible to continuously obtain an optimum correction value to thereby reduce the torque ripples including a change with time, even when the velocity detector 17 or the like is replaced by a service person or is mounted to a machine for the first time. Further, in calibration of the gain, learning may be performed only when the motor operates at a fixed velocity. Also, the sampling period of the position signal used for calibration may be changed to a long time period which is independent of the velocity detection period, so that the calibration precision can be increased. While the correction table generation section 24 is provided in the motor control apparatus of FIG. 2 in the above example, it can also be provided in the motor control apparatus of FIG. 1.

While in the present embodiment, both the offset correction value and the gain error table are corrected, just one of the values may be corrected. Further, while the velocity detection value correction section 23 and the correction table generation section 24 are provided in the motor control apparatus of FIG. 2 in the above example, they may be provided in the motor control apparatus of FIG. 1.

(5) Fifth Embodiment

Figure 7:
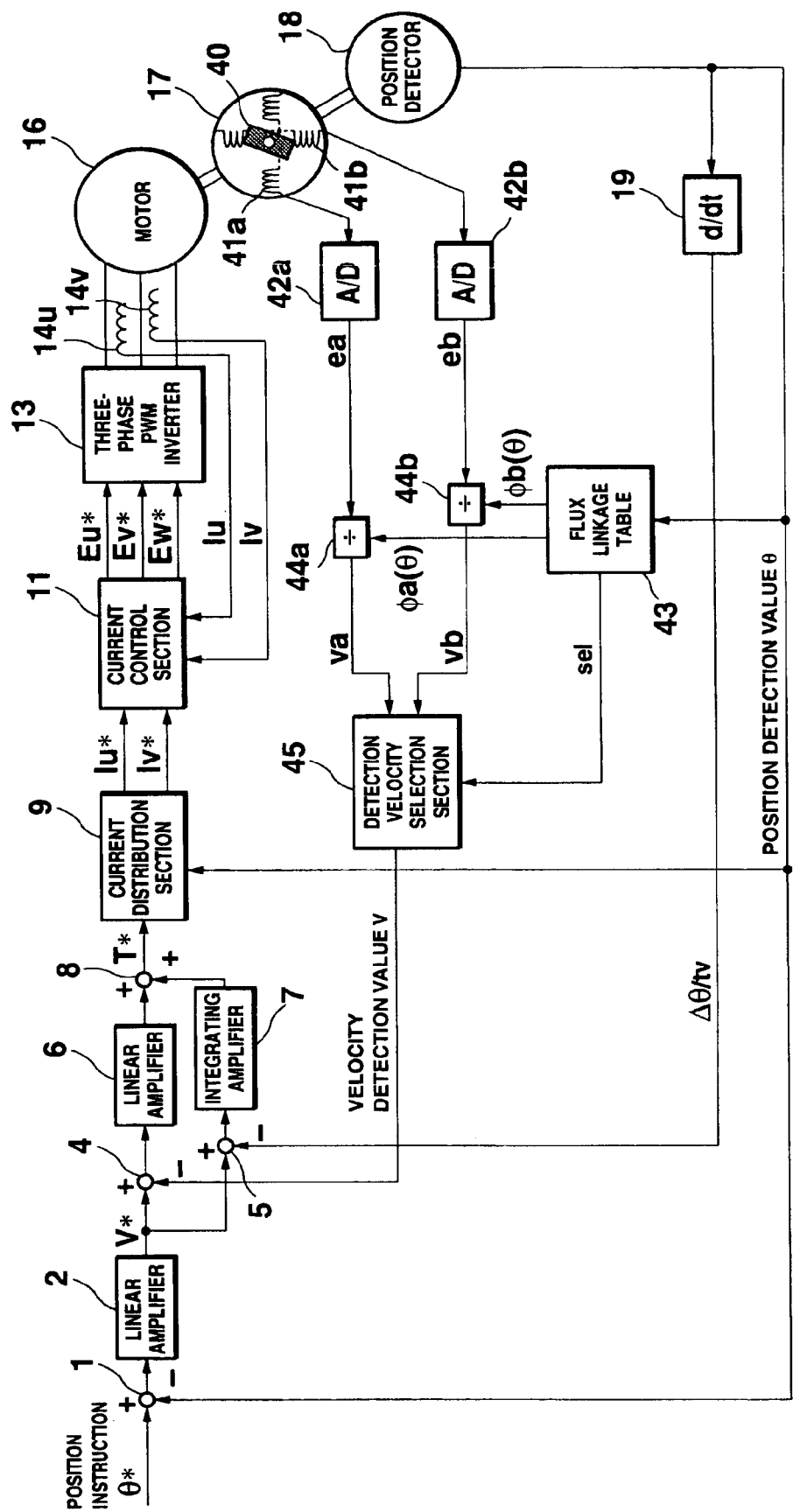
FIG. 7 is a block diagram showing a motor control apparatus according to a fifth embodiment of the present invention.

FIG. 7 schematically shows a structure of a motor control apparatus according to a fifth embodiment of the present invention. The motor control apparatus of this embodiment has a structure similar to that of the second embodiment, and elements having the same functions as those in the second embodiment are denoted by the same numerals.

The motor control apparatus of the fifth embodiment differs from the motor control apparatus of the second embodiment in that a velocity detector 17; A/D converters 42a, 42b for A/D converting the detected outputs; a flux linkage table 43, dividers 44a, 44b; a detection velocity selection section 45; or the like are additionally provided. The velocity detection value V obtained by the above structure is input, as a feedback signal, to the subtractor 4.

Figure 13:
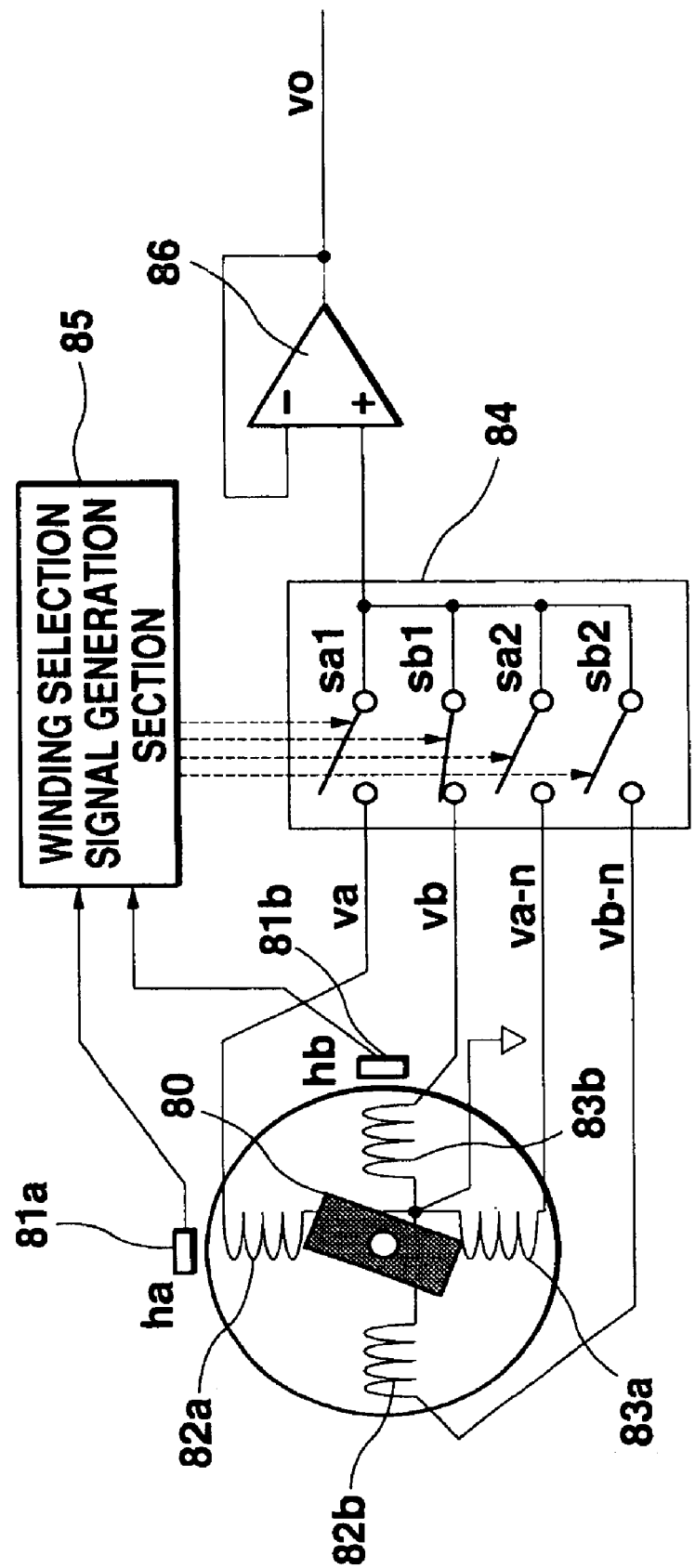
FIG. 13 is a view showing a brushless tachogenerator of related art.
Figure 14:
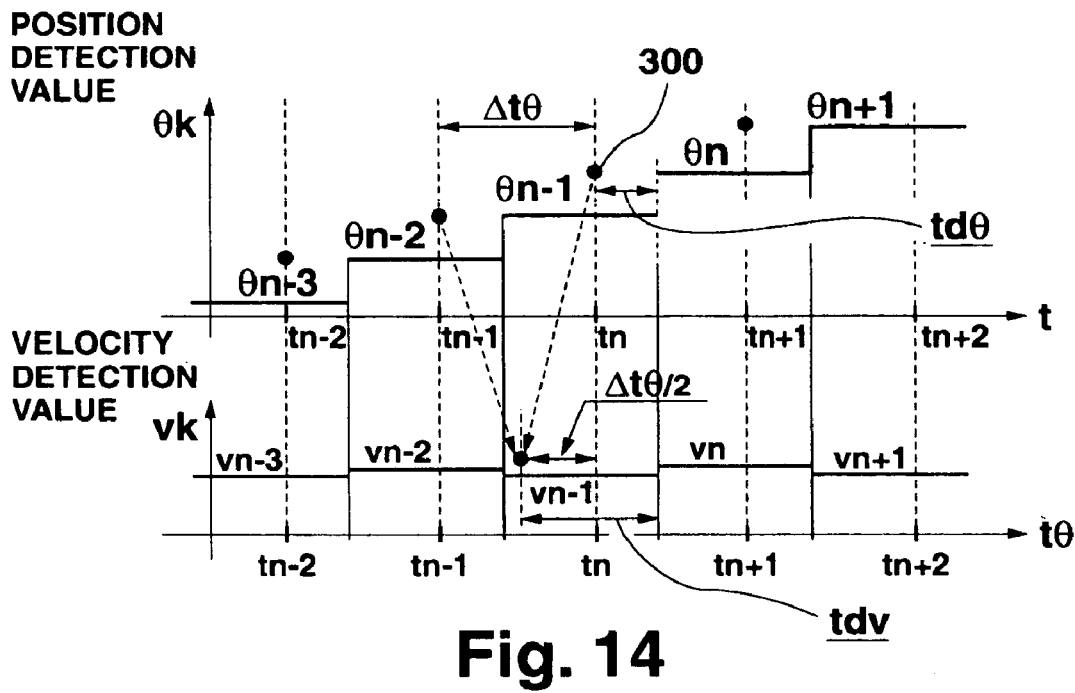
FIG. 14 is a time chart for explaining a delay time when calculating the velocity detection value from the output of the position detector.
Figure 15:
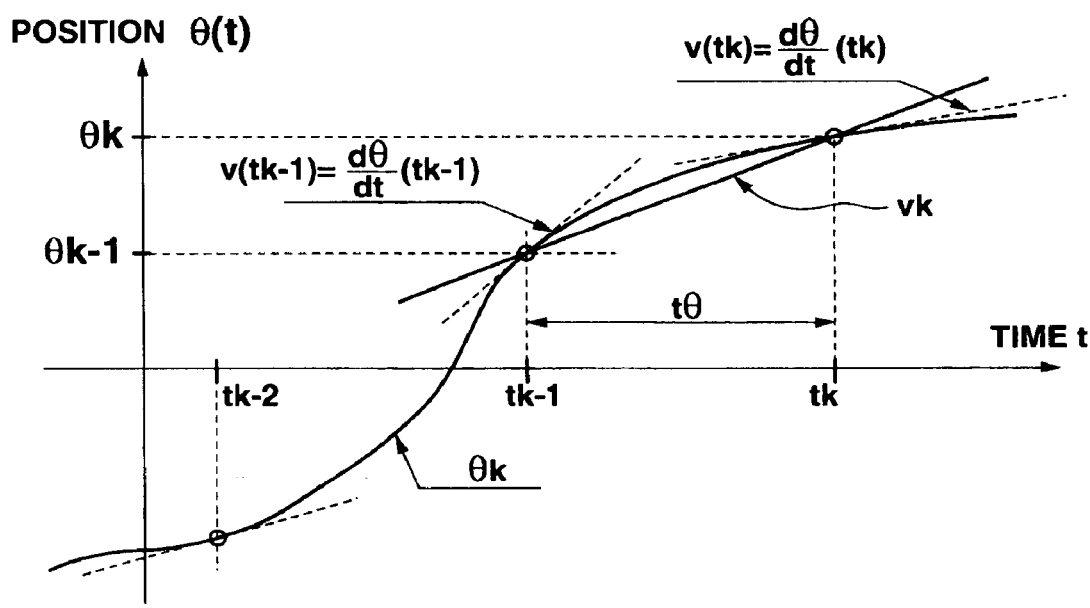
FIG. 15 is a further time chart for explaining a delay time when calculating the velocity detection value from the output of the position detector.
Figure 16:
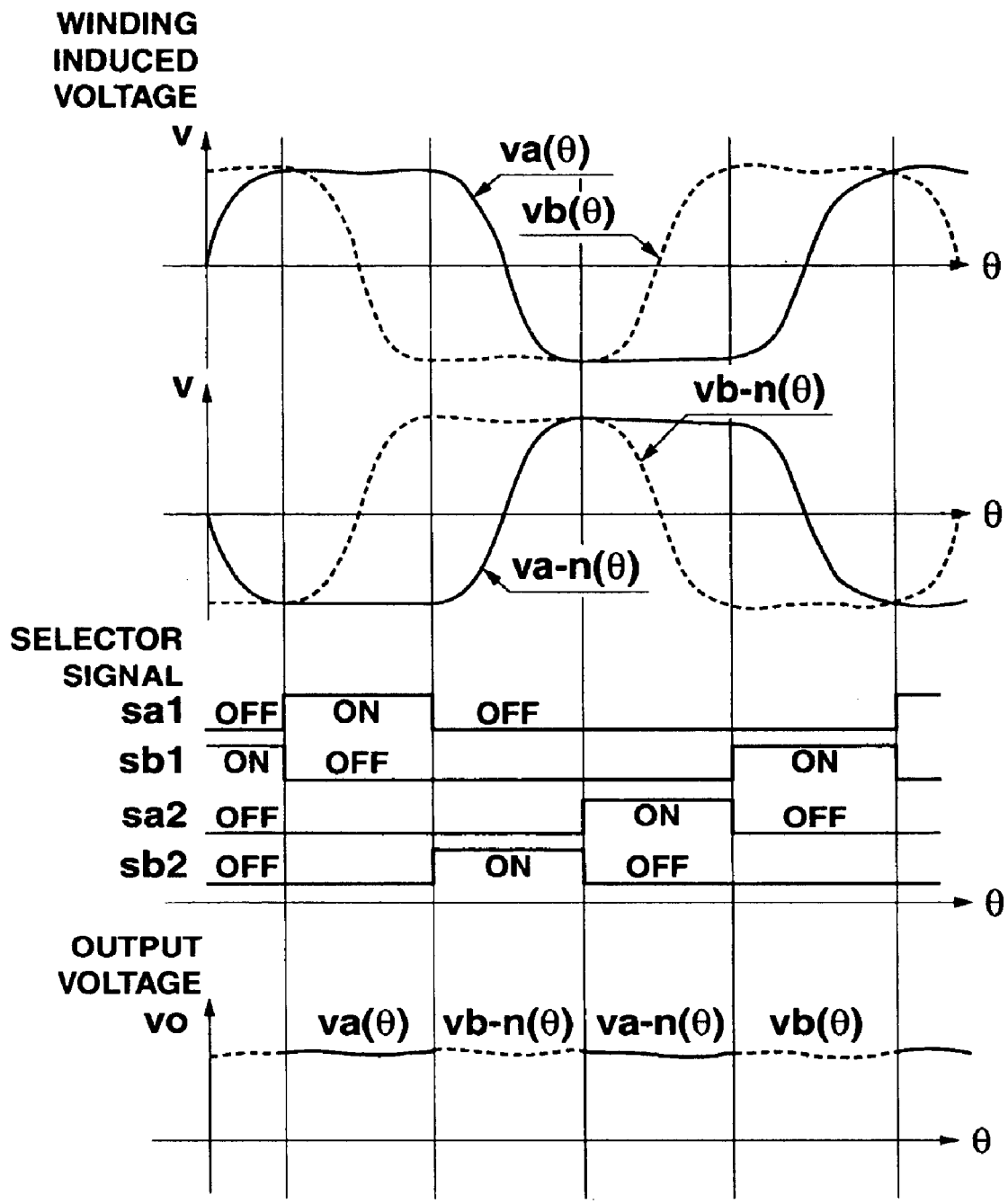
FIG. 16 is a view for explaining a signal of each section of a brushless tachogenerator of related art.

The interior structure of the velocity detector 17 of this embodiment, which is mechanically similar to the brushless tachogenerator of the related art shown in FIG. 13, differs from the related art brushless tachogenerator in that the velocity detector 17 of the fifth embodiment includes a permanent magnet 40 in the rotor section and two windings 41a and 41b with which the magnetic flux of the permanent magnet 40 is linked in the stator section. These two windings 41a and 41b are disposed at positions whose rotation angles differ from each other by 90°. While two permanent magnets are provided for the purpose of reducing ripples in this embodiment, a greater number of permanent magnets 40 may be provided.

Figure 8:
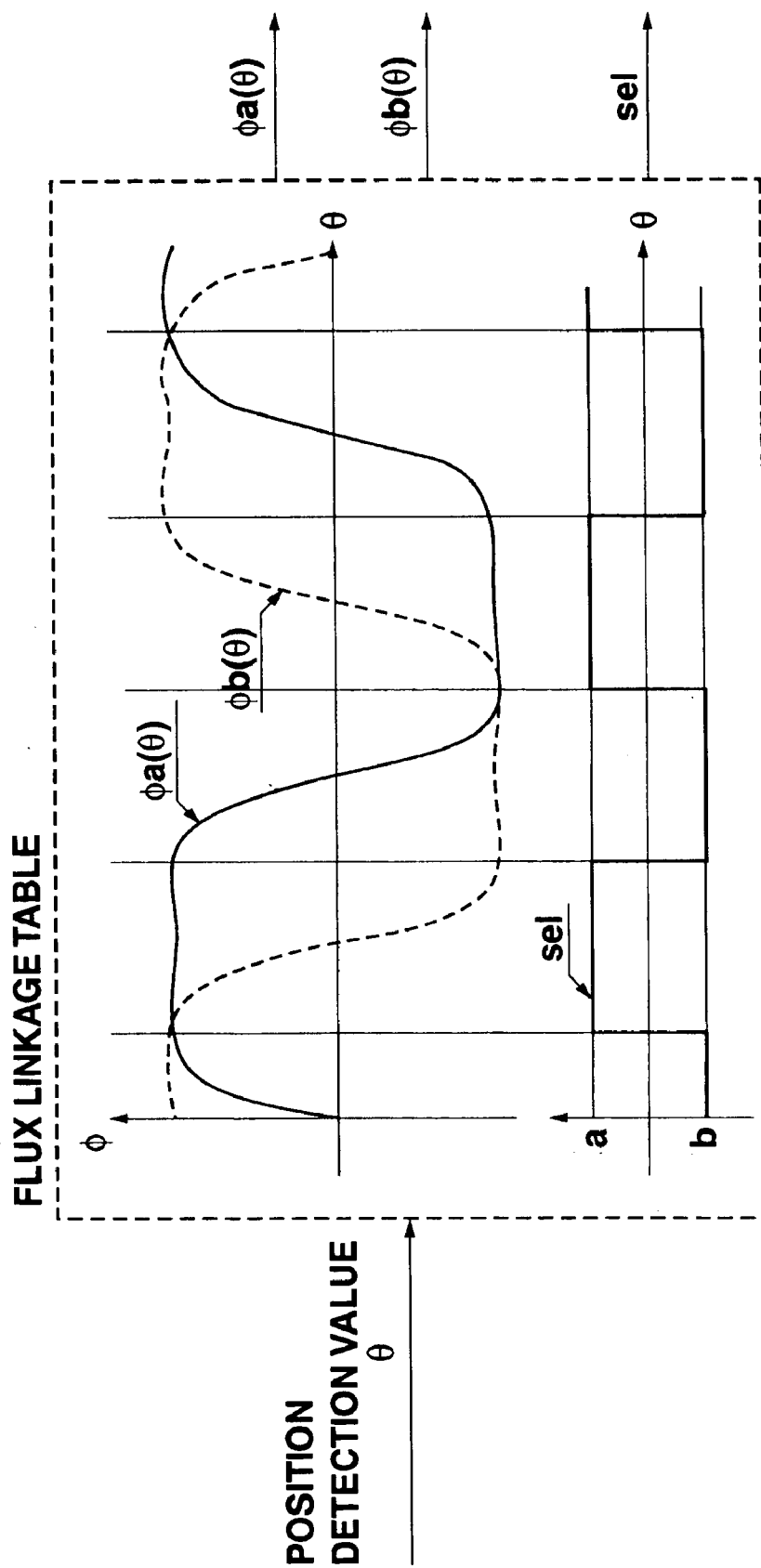
FIG. 8 is a block diagram showing data of a flux linkage table.

The flux linkage table 43 stores, in table form, data of flux linkage values $\phi_a(\theta)$ and $\phi_b(\theta)$ corresponding to the rotor rotation angle $\theta$ of the rotor section of the position detector 18, with respect to the two windings 41a and 41b, respectively. FIG. 8 plots each data in the flux linkage table with respect to the rotor rotation angle $\theta$ indicated in the horizontal axis and the flux linkage values $\phi_a(\theta)$ and $\phi_b(\theta)$ indicated in the vertical axis.

In this example structure, only two sets of windings are used. When the position detection value $\theta$ is input from the position detector 18, the flux linkage table 43 outputs the respective flux linkage values $\phi_a(\theta)$ and $\phi_b(\theta)$ concerning the respective windings 41a and 41b to the dividers 44a and 44b, respectively. On the other hand, induced voltages $e_a$ and $e_b$ of the two windings 41a and 41b are input to the A/D converters 42a and 42b, respectively, for A/D conversion, and the A/D converted induced voltages $e_a$ and $e_b$ are then input to the dividers 44a and 44b, respectively. In the dividers 44a and 44b, the A/D converted induced voltages $e_a$ and $e_b$ are divided by the flux linkage values $\phi_a(\theta)$ and $\phi_b(\theta)$ to obtain the velocity detection values $V_a$ and $V_b$, respectively. Further, the flux linkage table 43 outputs a selection signal sel indicative of either winding 41a or 41b having a greater absolute value of the number of flux linkages at the input position $\theta$. The detection velocity selection section 45 then selects one of the velocity detection values $V_a$ and $V_b$ in accordance with the selection signal sel and outputs the selected velocity detection value to the subtractor 4.

One of the features of this embodiment lies in that the induced voltages $e_a$ and $e_b$ are divided by the flux linkage values $\phi_a(\theta)$ and $\phi_b(\theta)$, respectively, as described above. This makes it possible to correct an error contained in the velocity detection values $V_a$ and $V_b$, which is caused by a change in the number of flux linkages, so that ripples of the detected velocity which depend on the rotation angle as found in the conventional brushless tachogenerator can be reduced. Further, because correction is made for each winding, the obtained values are not discontinuous, even when switching the selection of the windings, leading to reduction in ripples generated in the switching points of the windings. In addition, compared to the conventional system for detecting the velocity based on the change in position detected by the position detector, in the system of the present embodiment in which the number of windings for the detector can be minimized to two sets, the frequency of the periodic error components contained in the detection signal does not increase significantly, even when the number of rotation is increased. Consequently, highly accurate correction result can be calculated more easily than when correction of the interpolation error in the position detector is repeated several tens to several hundreds times per rotation. Accordingly, torque ripples can be reduced more significantly compared to a conventional system in which only the position detector is used for velocity detection.

While in the present embodiment the flux linkage table 43 is provided in the motor control apparatus of FIG. 2, the flux linkage table 43 can also be provided in the motor control apparatus of FIG. 1.

(6) Sixth Embodiment

Figure 9:
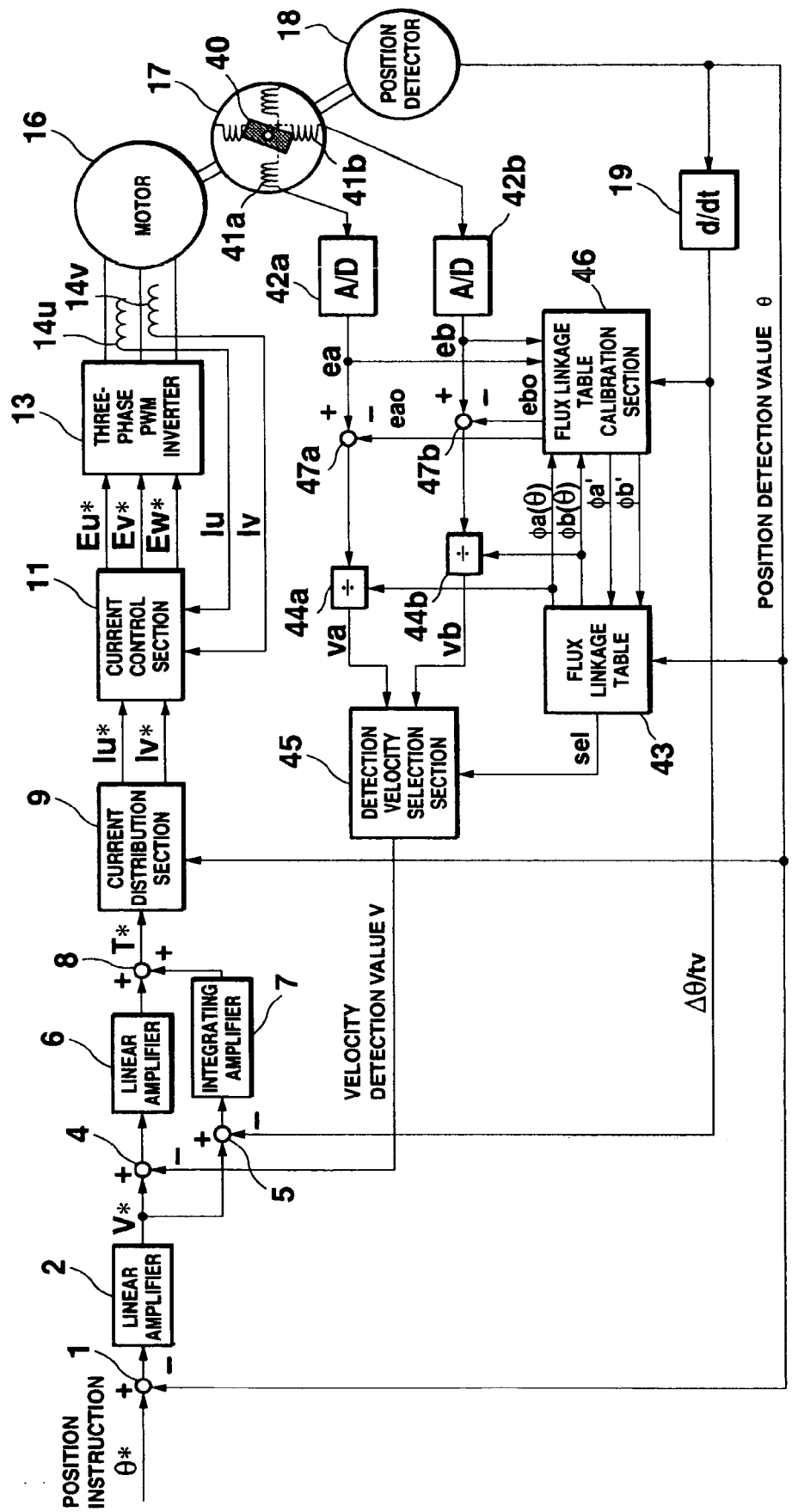
FIG. 9 is a block diagram showing a motor control apparatus according to a sixth embodiment of the present invention.

FIG. 9 schematically shows a structure of a motor control apparatus according to a sixth embodiment of the present invention. The motor control apparatus of this embodiment has a structure similar to that of the fifth embodiment, and elements having the same functions as those in the fifth embodiment are denoted by the same numerals.

Figure 10:
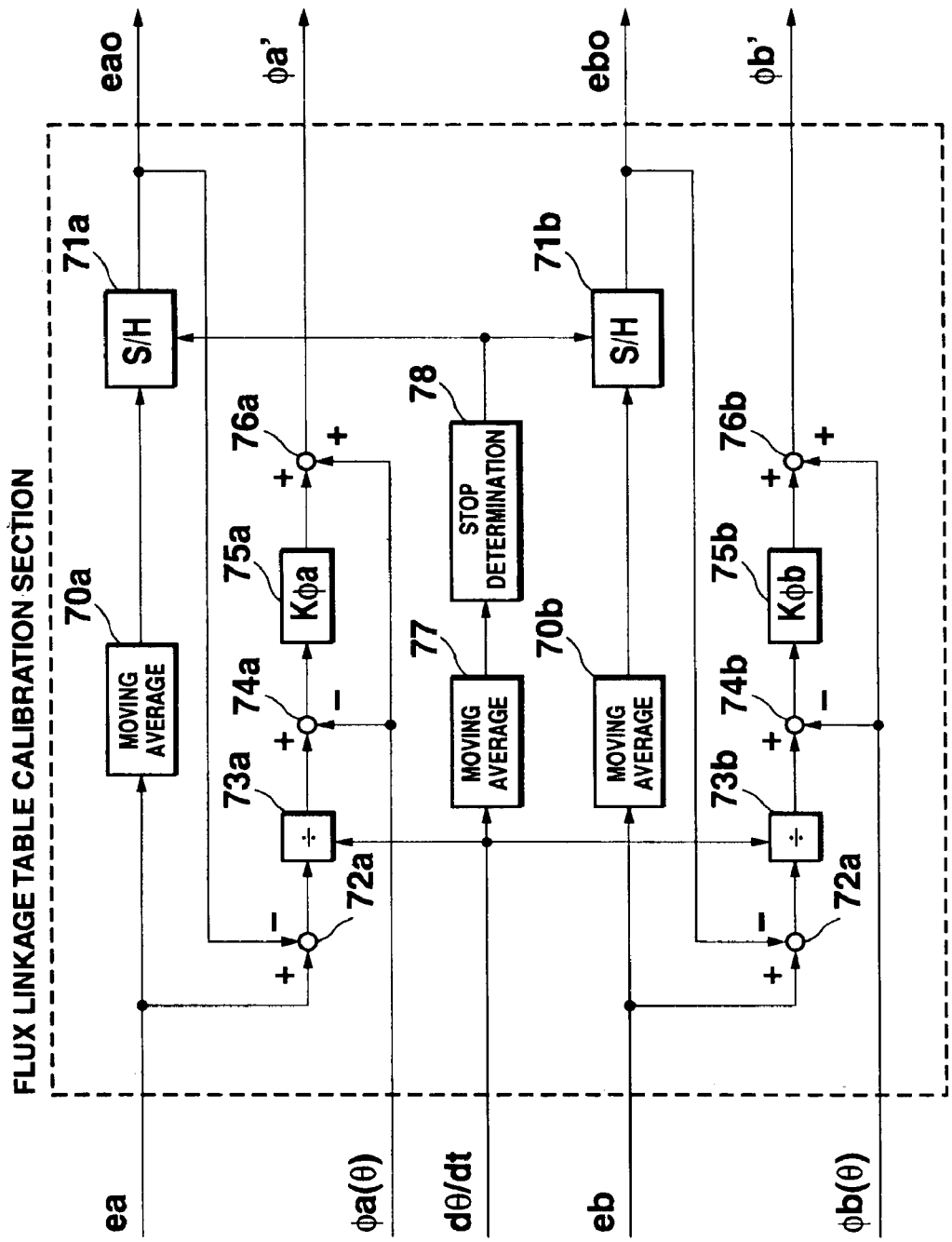
FIG. 10 is a block diagram showing a flux linkage table calibration section.
Figure 11:
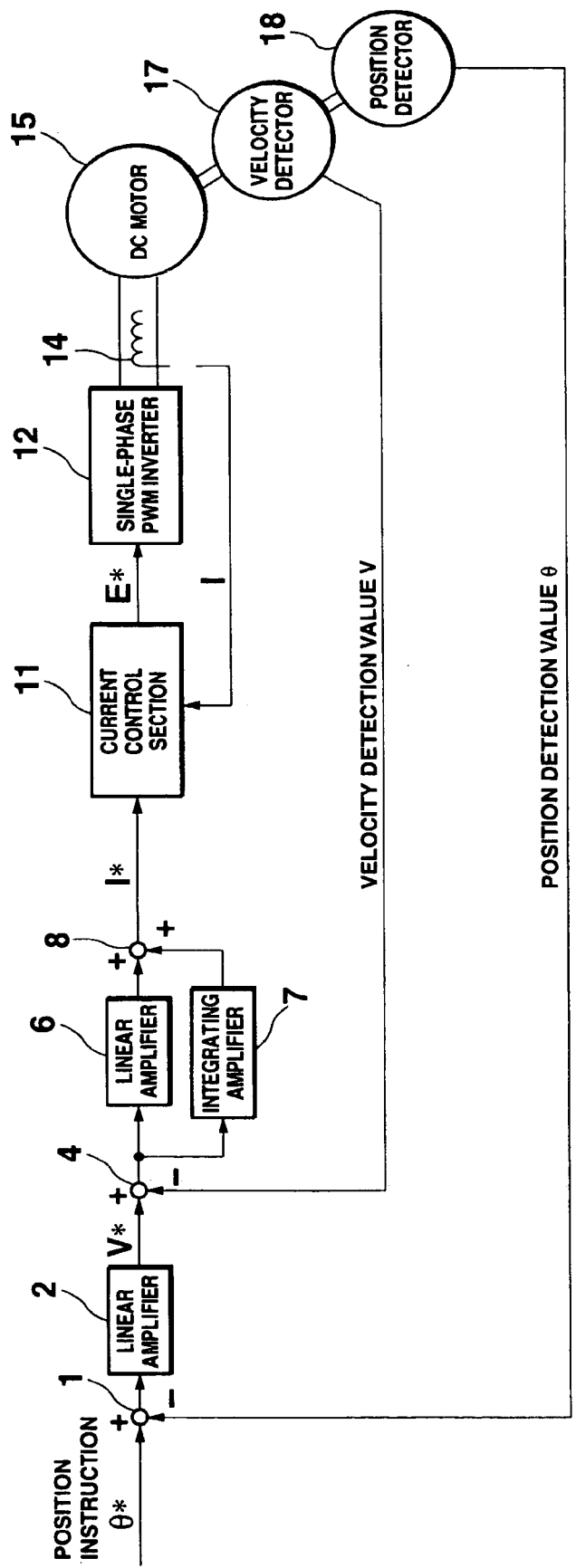
FIG. 11 is a block diagram showing a motor control apparatus of related art.

The motor control apparatus of the sixth embodiment differs from that of the fifth embodiment in that a flux linkage table calibration section 46 and two subtractors 47a and 47b for subtracting the offset components $e_{ao}$ and $e_{bo}$ contained in the induced voltages $e_a$ and $e_b$, respectively are additionally provided. With reference to the block diagram of FIG. 10, an example structure of the flux linkage table calibration section 46 will be described. Here, as the processing with respect to the induced voltage $e_b$ is substantially the same as the processing with respect to the induced voltage $e_a$, only the processing with respect to the induced voltage $e_a$ will be described.

The induced voltage $e_a$ from the winding 41a and the velocity calculation value $d\theta/dt$ obtained by time differentiation of the position detection value $\theta$ are input to the moving average calculation sections 70a and 77, respectively, for obtaining moving averages. The moving average result from the velocity calculation value $d\theta/dt$ is forwarded to the stop determination section 78. When the stop determination section 78 determines that the motor has been stopped for a predetermined period of time or longer, the output of the moving average calculation section 70a is sampled by the sample/hold section 71a as an offset correction value $e_{ao}$ contained in the induced voltage $e_a$.

One feature of the present embodiment is that the offset correction values $e_{ao}$ and $e_{bo}$ obtained as described above are output to the subtractors 47a and 47b, respectively, where the offset correction values $e_{ao}$ and $e_{bo}$ are subtracted from the induced voltages $e_a$ and $e_b$, thereby correcting offset errors in the induced voltages $e_a$ and $e_b$, and thus enabling reduction of the torque ripples to allow for more preferable control of the motor.

Further, in the subtractor 72a, the offset correction value $e_{ao}$ is subtracted from the induced voltage $e_a$ output from the A/D converter 42a. Then, the divider 73a divides the resultant induced voltage $e_a - e_{ao}$ by the velocity calculation value $d\theta/dt$ to obtain a ratio of the induced voltage $e_a - e_{ao}$ and the velocity calculation value $d\theta/dt$. Further, in the subtractor 74a, the flux linkage value $\phi_a(\theta)$ supplied from the flux linkage table 43 is subtracted from the ratio obtained by the above division, and the output from the subtractor 74a is further multiplexed with a time constant $K\phi_a$ (K is 1 or less) by the coefficient multiplier 76a, and then is added with the flux linkage value $\phi_a$ in the adder 76a.

Another feature of the present embodiment is that the flux linkage table 43 is updated with a new gain flux linkage value $\phi_a'(\theta)$ which is obtained by the above operation. Here, the subtractor 72a, the coefficient multiplier 75a, and the adder 76a constitute a filter indicative of the index response and therefore prevent mislearning of the coefficient of the flux linkage value table due to noise components mixed in the induced voltage ea or the position detection value θ.

While in the present embodiment, the flux linkage table 43 and the flux linkage table calibration section 46 are provided in the motor control apparatus in FIG. 2, these elements can alternatively be provided in the motor control apparatus of FIG. 1.

While the preferred embodiments of the present invention have been described using specific terms, such description is for illustrative purposes only, and it is to be understood that changes and variations may be made without departing from the spirit or scope of the appended claims.

What is claimed is:

1. A motor control apparatus for controlling the operation of a mover of a motor in accordance with a velocity instruction, the apparatus comprising:

a velocity detector for detecting a rotation velocity of the mover;

a position detector for detecting a position of the mover;

a differentiator for performing time differentiation with respect to the position detected by the position detector to obtain a velocity calculation value;

a feedback signal generating circuit for generating a feedback signal including the velocity detection value obtained by the velocity detector as a high frequency component and the velocity calculation value obtained by the differentiator as a low frequency component; and a linear amplifier and an integrating amplifier for performing PI control, the linear amplifier and the integrating amplifier performing linear amplification and integrating amplification of a difference between the velocity instruction and the feedback signal, respectively.

2. A motor control apparatus according to claim 1, comprising a velocity detection value correction section which has information concerning an offset error and corrects an offset error contained in the velocity detection value detected by the velocity detector based on the information.

3. A motor control apparatus according to claim 2, comprising a correction data generation section for generating data of the offset error or the correction table, based on a difference between the velocity detection value from the velocity detector and the velocity calculation value obtained by time differentiation of the rotation position detected by the position detector.

4. A motor control apparatus according to claim 1, comprising a velocity detection value correction section which has a correction table storing gain error information corresponding to the position information, captures the position detection value from the position detector, reads out the corresponding gain error information with reference to the correction table, and corrects a gain error contained in the velocity detection value obtained by the velocity detector based on the gain error information.

5. A motor control apparatus according to claim 1, wherein, the velocity detector includes a magnet fixed on one of a mover and a stator and a plurality of windings fixed to the other one of the mover and the stator for generating a plurality of induced voltages having different phases depending on the change of flux linkage of the magnet, the motor control apparatus further including correction means which has a flux linkage table storing information on the number of flux linkages corresponding to the position information, captures the position detection value from the position detector, obtains information of the number of flux linkages corresponding to the position detection value with reference to the flux linkage table, and corrects the induced voltage generated by the plurality of windings based on the information of the number of flux linkages.

6. A motor control apparatus according to claim 5, comprising a flux linkage table calibration section for calibrating data of the flux linkage table based on the induced voltage value of each of the windings.

7. A motor control apparatus for controlling the operation of a mover of a motor in accordance with a velocity instruction, the apparatus comprising:

a velocity detector for detecting a rotation velocity of the mover;

a position detector for detecting a position of the mover;

a differentiator for performing time differentiation with respect to the position detected by the position detector to obtain a velocity calculation value; and a linear amplifier and an integrating amplifier for performing PI control, the linear amplifier performing linear amplification of a difference between the velocity instruction and the velocity detection value obtained by the velocity detector, and the integrating amplifier performing integrating amplification of a difference between the velocity instruction and the velocity calculation value obtained by the differentiator.

* * * * *